INVENTOR.
BY SAMU-EL ISH-SHALOM
Attorney

Nov. 18, 1941.  SAMU-EL ISH-SHALOM  2,262,940
MIXING AND DRYING APPARATUS
Filed Aug. 7, 1940  7 Sheets-Sheet 6

INVENTOR.
SAMU-EL ISH-SHALOM
BY
Attorney

Nov. 18, 1941. SAMU-EL ISH-SHALOM 2,262,940
MIXING AND DRYING APPARATUS
Filed Aug. 7, 1940 7 Sheets-Sheet 7

INVENTOR
SAMU-EL ISH-SHALOM
BY Harry Radzinsky
Attorney.

Patented Nov. 18, 1941

2,262,940

UNITED STATES PATENT OFFICE 2,262,940

MIXING AND DRYING APPARATUS

Samu-El Ish-Shalom, Brooklyn, N. Y.

Application August 7, 1940, Serial No. 351,691

4 Claims. (Cl. 259—4)

This invention relates to mixers, dryers, sterilizers or similar devices provided with a mixing chamber wherein a plurality of powdered materials such as for example, are employed in the manufacture of cosmetics, are delivered in a stream of air directed into the chamber having two or more passages to thereby revolve or swirl such materials at great speed and under great compressional energy to both dry and thoroughly mix the same. Examples of the type of machine to which the invention relates will be found in my Patents Nos. 2,193,001 to 2,193,005 inclusive.

One of the objects of the present invention is to provide in a machine of the character described a single air inlet through which a stream of compressed air is projected, said inlet communicating with the interior of a mixing chamber of such formation that parts thereof tend to divide the stream of air and direct portions of it in opposite directions with swirling movement to thereby whirl the materials delivered into the chamber and thoroughly mix and dry the same.

Another object of the invention is to provide, in a machine of the character mentioned, means by which the divided air stream and the materials transported by it, will be directed toward and merge with the air-flow from the air inlet to be again divided or broken up into separate streams and greatly facilitate the mixing action.

Another object of the invention is to provide an air chamber so designed and shaped that a minimum of air may be utilized and the expense of the mixing operation greatly decreased.

A still further object of the invention is to provide means by which the air stream dividing-element may be replaced or modified to produce the desired stream dividing function according to various requirements.

It is a further object of the invention to provide means for controlling the air flow into the mixing chamber by the utilization of a valve within the mixing chamber controlling the flow through an air inlet nozzle also therein located.

It is a further object of the invention that the improved apparatus be of simple construction and easy to clean and maintain in a sanitary condition and wherein the various parts are conveniently adjustable to procure efficient operation and are readily accessible for inspection, cleaning and adjustment.

In the accompanying drawings wherein several illustrative embodiments of the invention are shown.

Figure 1:
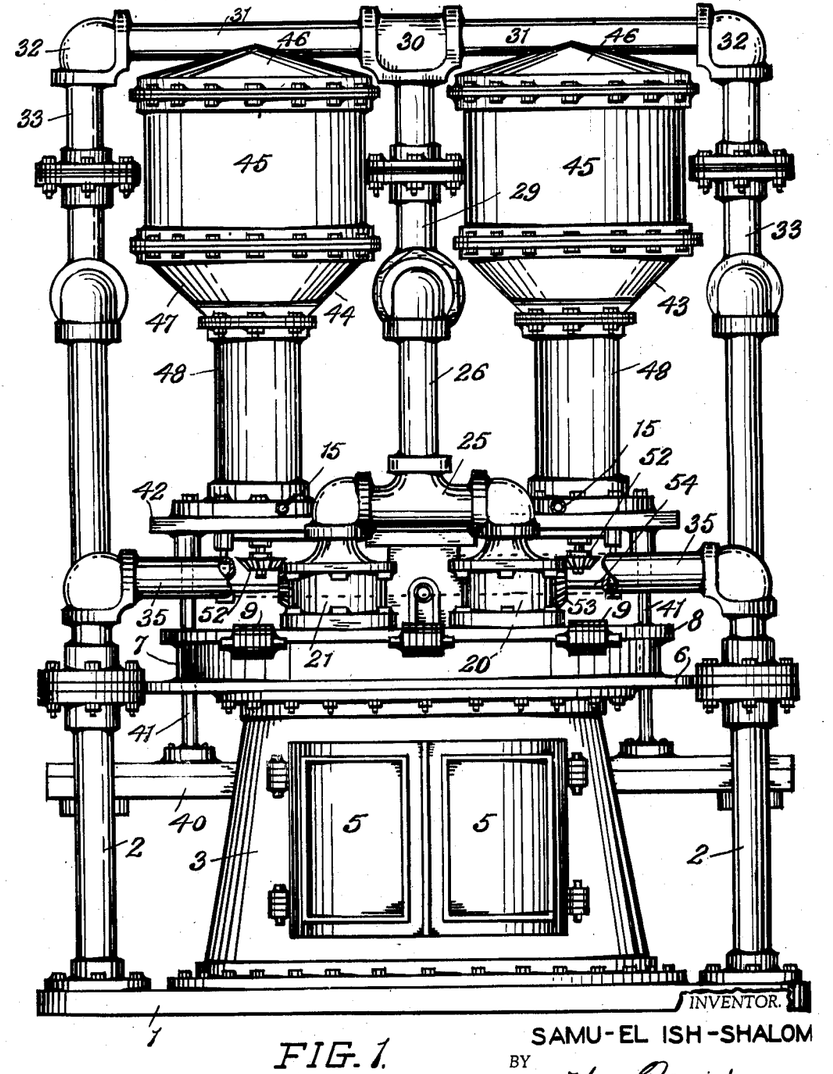
Fig. 1 is a front elevation of a machine constructed in accordance with the invention, with parts being broken away to disclose construction.
Figures 2, 3:
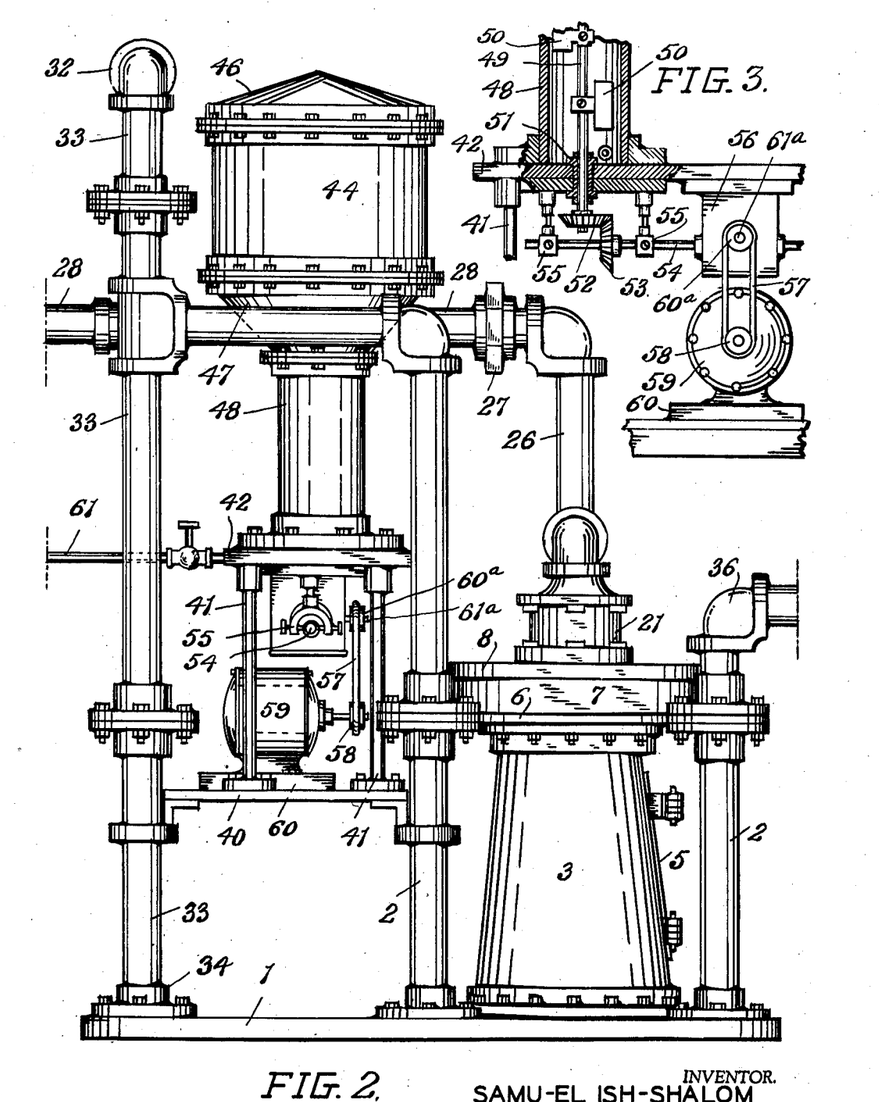
Fig. 2 is a side elevation of the same.
Fig. 3 is a view, partly in section, of the lower end of one of the hoppers showing the mechanism for agitating the material delivered therefrom.

With reference to the structure shown in Figs. 1, 2 and 3, 1 indicates the base of the machine which is mounted upon the floor or upon any other suitable support. Rising from the base 1 are four supporting posts 2, between which is disposed a housing 3 secured to the base 1 and containing a collection receptacle 4 (Fig. 4) into which the mixed materials fall after having been properly mixed. Hinged doors 5 at the front of the machine provide access to the collection receptacle permitting its removal for emptying and subsequent replacement.

Figure 4:
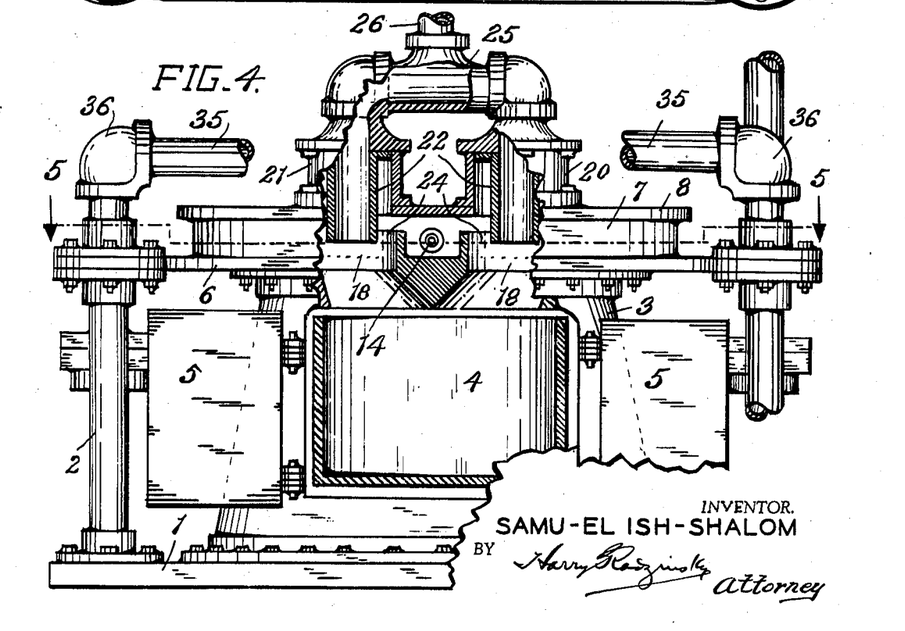
Fig. 4 is a front view with parts in section of the mixing chamber and collection receptacle.
Figure 5:
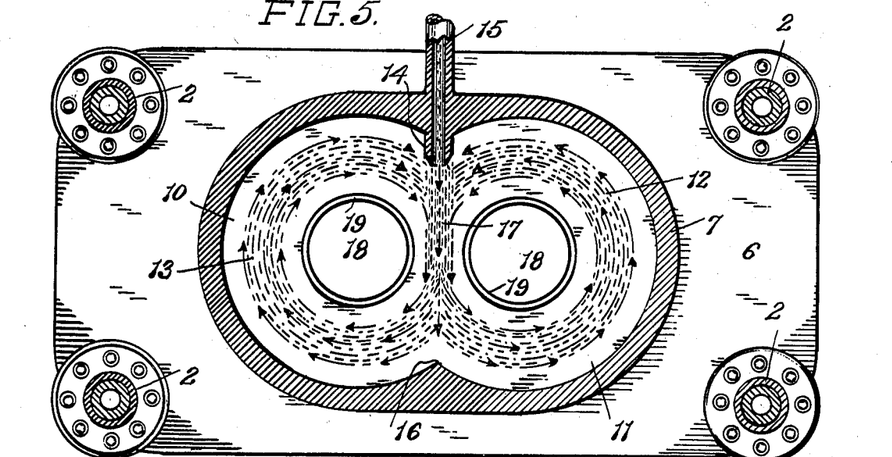
Fig. 5 is a sectional view on the line 5—5 of Fig. 4, looking in the direction of the arrows.
Figures 6, 7, 8:
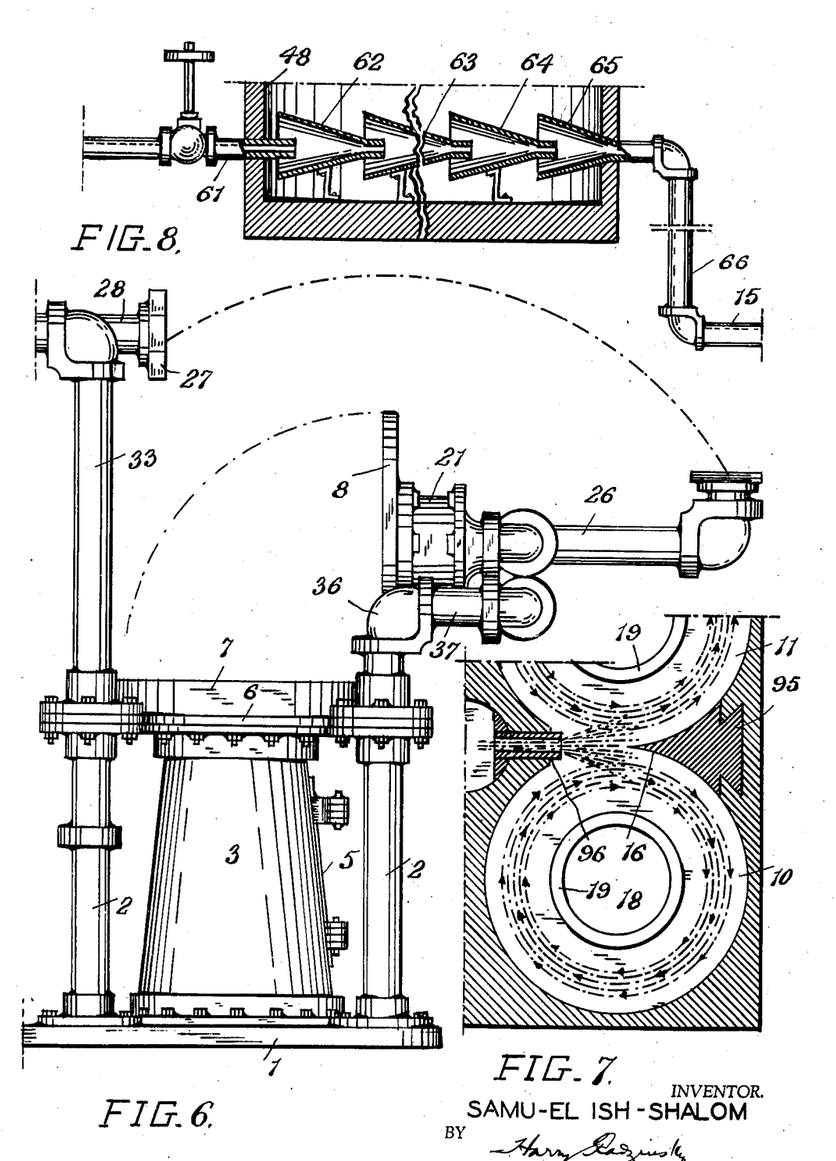
Fig. 6 is a side elevation of a portion of the machine showing how the top or cover of the mixing chamber and the exhaust pipes attached thereto may be swung open to uncover the mixing chamber.
Fig. 7 is a horizontal sectional view through one form of mixing chamber.
Fig. 8 is a sectional view through the lower end of one of the hoppers showing a means for feeding the material out of the hopper by the use of compressed air.

Supported upon the posts 2 is the mixing chamber, shown in detail in Figs. 4 and 5, the same including the base plate 6 attached to the top of the housing 3 and also supported by the posts 2. The mixing chamber is provided with the vertical side wall 7 adapted to receive the top or cover member 8 attached thereto by means of the hinges 9 (Fig. 1), permitting the cover to be opened by being swung forwardly as indicated in Fig. 6 when access to the interior of the mixing chamber for cleaning or for other purposes, is desired.

The mixing chamber is provided with the two passages 10 and 11 within which air streams designated at 12 and 13 are respectively swirled to thereby whirl materials to be mixed and dried as will be hereinafter pointed out. The two passages 10 and 11 of the mixing chamber merge at a central point in the chamber and at this point an air inlet or nozzle 14 enters the chamber and directs air under pressure as well as materials to be mixed, into the chamber. The pipe 15 conveying air under pressure into the mixing chamber is connected to the feed hoppers and through them to a source of air so that a uniform delivery of compressed air and materials into the chamber results.

Preferably formed as a part of the inner surface of the side wall 7 of the mixing chamber and located diametrically opposite to the inlet nozzle 14 is a wedge-shaped air-flow-dividing member 16 so disposed in front of the inlet opening that the air flow emanating therefrom will impinge against it and be divided into separate streams, one of which will swirl clockwisely in the passage 10 as indicated at 13, while the other air stream will swirl counterclockwisely in the passage 11 as indicated at 12 in Fig. 5. It will be obvious that materials delivered into the passages 10 and 11 of the mixing chamber will be whirled about within the chamber by the air streams 12 and 13, these streams and the materials transported thereby merging with the air flow emanating from the inlet nozzle 14, as indicated at 17 and being again impinged against the wedge-shaped element 16 to again become dividing into streams 12 and 13.

Each of the mixing chamber passages 10 and 11 is provided with a central opening 18 surrounded by an upstanding wall 19, the mixed material falling down through these openings and into the collection receptacle 4 as hereinafter described.

Secured to the cover 8 are spaced housings 20 and 21, each of which surrounds an air exhaust pipe 22, the lower end of each exhaust pipe extending into one of the openings 18 but spaced from the wall 19 surrounding the same so that an annular space 24 is provided between each exhaust pipe and wall 19 through which the mixed materials may descend to reach the collection receptacle.

Pipes 22 are connected at their upper ends by the manifold pipe 25 secured to vertically extending pipe 26 connected by coupling 29 to rearwardly extending pipe 28 leading to a suitable point of exhaust. Pipe 28 is supported or hung from a supporting member 29 connected by a union 30 with a cross rod 31 attached at its opposite ends to elbows 32 secured on the upper ends of posts or standards 33 having their lower ends mounted in pipe flanges 34 bolted to the base 1.

As will be seen from Fig. 6, the inside of the mixing chamber is readily accessible for cleaning by swinging the lid or top 8 of the mixing chamber forwardly on its hinges 9 as shown in Fig. 8. To do this, the coupling 27 is first disconnected and then the lid or cover and piping 25 and 26 attached thereto may be swung forward. When the cover or lid is swung forward in the manner described, it is supported in such open position, on a cross bar 35 secured to elbows 36 attached to piping 37 at the upper end of the two front posts 2.

Supported between the two posts 33 and two of the rear posts 2 is a plate 40 and rising therefrom are four posts 41 which support the base 42 of the material-supply means or hoppers 43 and 44. Since both of the hoppers and the mechanism for operation of the same are alike, a description of the mechanism of hopper 44 will suffice. It comprises an upper portion 45 provided with a removable lid 46 through which the hopper is filled with the powdered material to be mixed. A conical portion 47 at the lower end of the portion 45 delivers the materials by gravity into the tubular portion 48. Operative in the tubular portion 48 is a vertically disposed shaft 49 (Fig. 3) provided with wings or paddles 50, which when the shaft is rotated, serve to agitate the materials and prevent piling up or clogging in the portion 48 of the hopper. Shaft 49 is rotatively mounted in bearing 51 and carries a beveled gear 52 at its lower end, said gear meshing with beveled gear 53 secured on the shaft 54 rotatively mounted in the bearings 55 and driven by reducing gearing contained in the gear box 56. The belt 57 extending around pulley 58 on the shaft of electric motor 59 drives pulley 60a on shaft 61a of the reducing gearing in the manner clearly disclosed in Fig. 3. The base 60 of the motor is secured upon the plate 40 as seen in Fig. 2. Shaft 54 extends across the machine to drive the agitating mechanism of hopper 43 in the manner described in respect to hopper 44.

Entering into the lower part of the hopper portion 48 is an air-delivery pipe 61 through which air under pressure is delivered into the part 48 and the air so delivered, forces the materials continuously out of the hopper through pipe 15 and out through nozzle 14 and thus into the mixing chamber. As an alternative for such an arrangement, outlet pipes leading from the two hoppers may each be connected at any suitable point into one of the sections 10 or 11 of the mixing chamber. Another modification of the means for feeding the materials from the hoppers is shown in Fig. 8, wherein the inlet pipe 61 enters the part 48 of the hopper and extends into the end of a funnel-shaped member 62 which has its smaller end entering into the large end of funnel 63 that communicates in a similar manner with funnel 64 leading into funnel 65 connecting to pipe 66 connecting either to pipe 14 or else leading directly into one of the sections 10 or 11 of the mixing chamber. Various other arrangements may be utilized to insure regular feeding of the materials into the mixing chamber.

Figure 14:
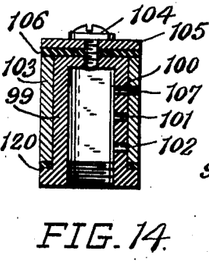
Figure 15:
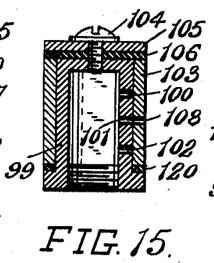
Figure 16:
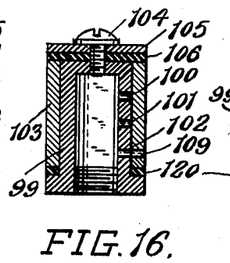
Figure 17:
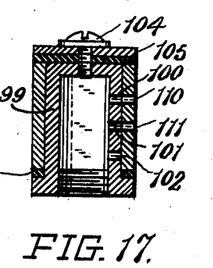

Briefly, the operation of the machine is as follows:

Motor 59 is set in operation and this agitates the materials in the hoppers 43 and 44. The flow of compressed air blows the materials in the mixing chamber, the materials and air flow entering therein through nozzle 14. The air flow and materials conveyed thereby are split into separate streams by impingement against the wedge-shaped element 16 and the two air streams 12 and 13 swirl around the annular chamber sections 10 and 11 carrying the materials and thoroughly mixing the same in the manner heretofore explained. As the materials are whirled around the mixing chamber they mount over the upper edge of the walls 19 and fall down through the openings 18 defined by said walls and drop into the collection receptacle 4. The air exhausts upwardly through pipes 22. Since the compressed air is warm it tends to dry the materials as it mixes them, and such drying action is important, particularly in cases of finely divided materials which, upon accumulation of moisture, tend to lump, harden and cake and make thorough mixing therefore difficult. The action of the compressed air, as it whirls the materials around the chamber is first to dry the materials, causing lumps and caking to become loosened, and then, as the whirling action continues, to thoroughly mix the materials and deliver them in mixed condition out of the mixing chamber, continuously.

Figure 9:
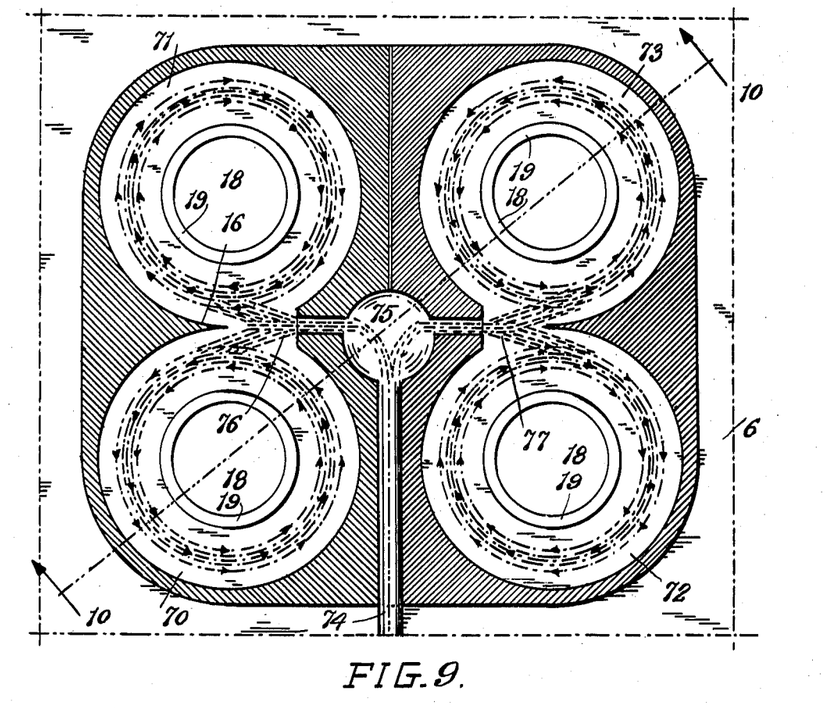
Fig. 9 is a horizontal sectional view through a modified form of mixing chamber.
Figure 10:
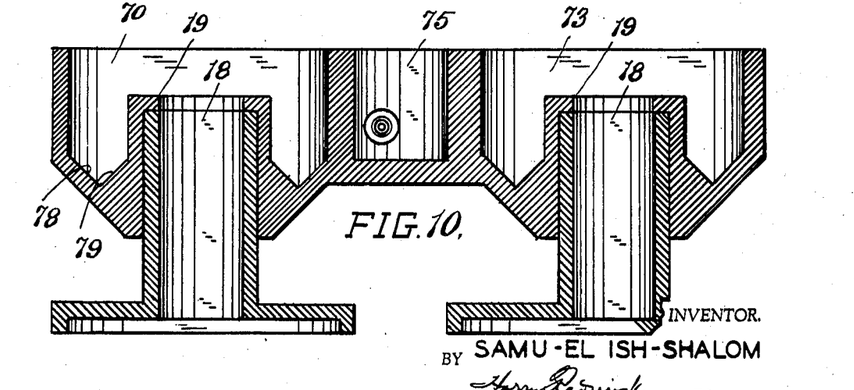
Fig. 10 is a sectional view on the line 10—10 of Fig. 9, looking in the direction of the arrows.

While the mixing chamber shown in Fig. 5 discloses two annular air passages with a single air and material inlet entering the chamber at a point between the passages, this arrangement may be varied to suit different mixing requirements. For example in Fig. 9, the mixing chamber is provided with four channels, namely those shown at 70, 71, 72 and 73. An inlet passage 74 through which air under pressure as well as the materials to be mixed, is forced, enters into the manifold 75 in which the air flow is divided into the streams 76 and 77. The stream 76 flows into the chamber composed of the channels 70 and 71 where it is split up or divided by the wedge-shaped element 16 and caused to whirl in two separate streams through channels 70 and 71 as explained in reference to the structure of Fig. 5. The air stream 77 flows in like manner into the chamber composed of the channels 72 and 73 where it operates in a manner similar to that described in respect to channels 70 and 71. The mixing chamber shown in Fig. 9 and also in section in Fig. 10 has the channels 70 to 73 inclusive formed with inclined surfaces 78 and 79 at the bottom, this serving to avoid the accumulation of materials in the corners or junctions of the side walls and bottom, as sometimes occurs with certain materials in cases where a flat bottom is employed in the mixing chamber. While I have shown in the several embodiments of the invention, the channels in each mixing chamber as being of the same diameter, it will be clear that this is not absolutely necessary since one channel may under special circumstances be of greater capacity and of different size or diameter than the other. The shape of each channel may also be varied as for example, they may be hexagon, oval or octagon or of other suitable shape.

Figure 11:
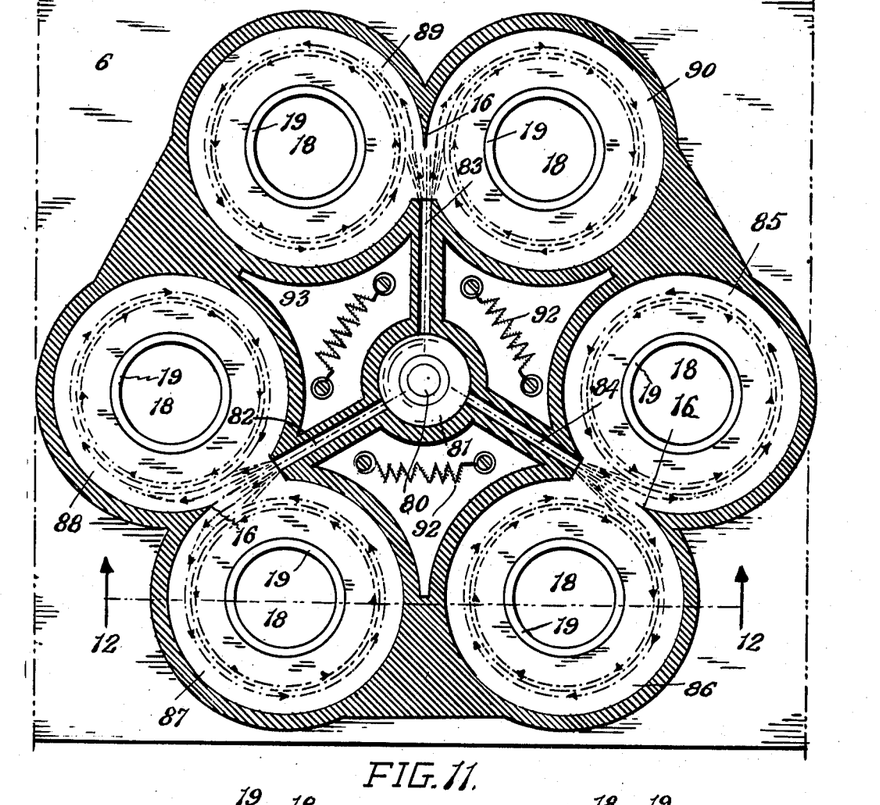
Fig. 11 is a horizontal sectional view through another modified form of mixing chamber.
Figure 12:
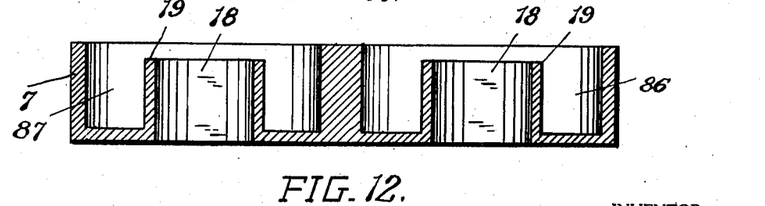
Fig. 12 is a sectional view on the line 12—12 of Fig. 11, looking in the direction of the arrows.
Figure 13:
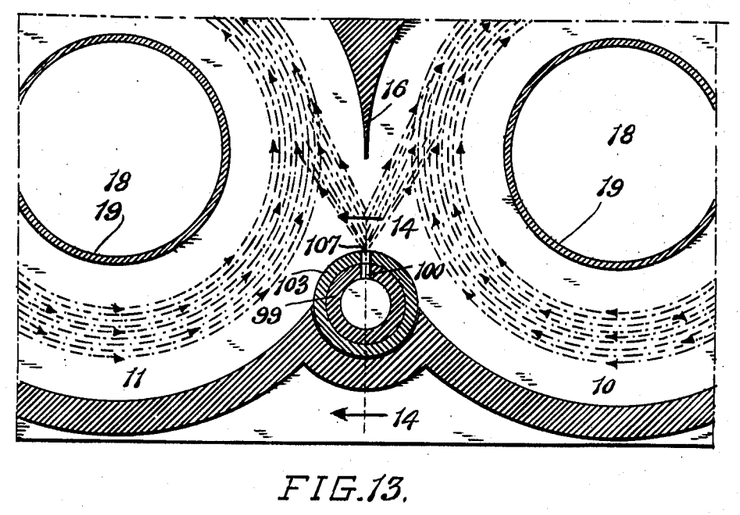
Fig. 13 is a sectional view through a portion of the mixing chamber showing an adjustable air nozzle or jet and Figs. 14 to 20 inclusive are similar sectional views through the improved nozzle or jet showing how the same may be adjusted to secure various arrangements of the air inlet openings.

In the modification shown in Fig. 11 the mixing chamber is made up of three groups of channels, each group consisting of two channels. The air and material inlet shown at 80 enters into the manifold passage 81 and from there passes through the three passages 82, 83 and 84, each of said passages leading into one of the groups of channels. For example, the passage 84 enters at a point between the channels 85 and 86 and the flow of air through said passage is split by the wedge-shaped element 16. Similarly, passage 82 enters into the group composed of channels 87 and 88, while the flow from passage 83 enters into the group composed of channels 89 and 90. The action of the air flow in each group of channels is as disclosed in respect to the structure shown in Fig. 5. In addition, I have shown in Fig. 11, the utilization of heating elements 92 located in the spaces 93 between the various sections of the heating chamber, the purpose of such heating elements being to heat the compressed air so that it materially aids in the drying of the materials to be mixed. Such heating means can be either used or omitted, dependent upon the materials being mixed.

While I have thus far described the wedge-shaped air separating element 16 as being an integral part of the wall portion of the mixing chamber, this need not necessarily be the case, since after considerable use, the impingement of air under pressure and the material transported thereby may tend to wear away the wedge-shaped separating element thus altering its shape and requiring its replacement. In Fig. 7 is suggested a manner in which the wedge-shaped element 16 may be removed and replaced. Therein said element is shown as provided with a dove-tailed rib 95 fitted into a complementary groove in the wall of the mixing chamber. With this arrangement, the wedge-shaped element may be readily removed and replaced with one of similar or any other shape when desired. Similarly the air inlet nozzle 96, instead of being an integral element formed on the mixing chamber, may be removable and replaceable as shown in Fig. 7.

Figure 18:
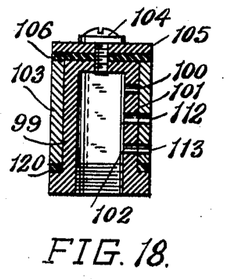
Figure 19:
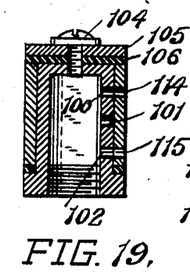
Figure 20:
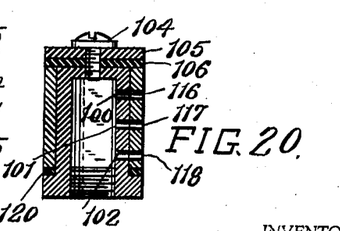

In Figs. 13 to 20 inclusive is shown an arrangement by which the amount of air directed into the mixing chamber may be regulated to secure various results in mixing. Therein, the air and possibly the material supply is connected to a vertically disposed nozzle 99, having a number of ports in its side wall, three of said ports being shown at 100, 101 and 102 and arranged one above the other. A valve member or sleeve 103 closely fits around the nozzle 99 and is normally held in any selected position by means of the screw 104 which extends through the washer 105 and gasket 106. A gasket 120 is also employed at the lower end of the valve. The sleeve or valve 103 is provided with a number of holes, one of which is shown at 107 in Fig. 14 and is so located that when it is in alignment with hole 100 in the nozzle 99, holes 101 and 102 in said nozzle are shut off by the body of the valve. Valve 103 also has a hole 108 which is adapted on rotative movement of the valve to be aligned with the hole 101 while the valve shuts off the holes 100 and 102. Similarly, hole 109 in the valve may be aligned with hole 102 in the nozzle, while holes 100 and 101 are shut off. Valve 103 is also provided with the two holes 110 and 111, properly spaced to simultaneously align respectively with holes 100 and 101 while the valve shuts off hole 102. A second pair of holes, indicated at 112 and 113, is provided with the valve 103 for respective simultaneous alignment with the holes 101 and 102, as shown in Fig. 18, while hole 100 is shut off. In Fig. 19 it will be seen that the valve 103 also has a pair of holes, indicated at 114 and 115 for simultaneous alignment with the holes 100 and 102 while hole 101 is shut off, and in Fig. 20 the valve is shown provided with the three holes 116, 117 and 118 for simultaneous alignment with the three holes 100, 101 and 102 in the nozzle. With the several arrangements shown, and other possible arrangements of the valve openings in respect to the nozzle openings, it will be apparent that many variations of the inlet openings may be had through which the air under pressure, the materials to be mixed or both may be ejected into the mixing chamber. The holes in the valve may also, if desired, be of smaller diameter than those in the nozzle, or some of the holes in the valve may be larger than the others therein whereby great flexibility in regulation of the air flow is attained.

While I have shown several embodiments of the invention, it is obvious that the same is not to be restricted thereto, but is broad enough to cover all structures coming within the scope of the annexed claims.

What I claim is:

1. In a mixing machine for powdered materials, a mixing chamber having a plurality of pairs of annular merging channels in the same horizontal plane through which air under pressure and materials to be mixed are swirled, each pair of said channels having an air inlet through which air under pressure continuously enters, means disposed between the channels in each pair for diverting air streams into said channels and causing said streams to merge with the air flow from the inlet at the point of joinder of the channels in each pair, means within and surrounded by each channel from which mixed powdered materials are continuously delivered from the chamber while the air inlet is continuously feeding air and unmixed powdered materials into the chamber, a manifold connection between the air inlets and a single source of air under pressure connected to said manifold.

2. In a mixing machine for powdered materials, a mixing chamber having several annular air channels in which air under pressure and materials to be mixed are swirled, an air inlet entering into the chamber at a point between said channels, said channels merging adjacent said air inlet whereby streams of air whirled in the channels will merge with the air flow from the air inlet, and valve means within the chamber at the air inlet for regulating the flow of air out of said inlet, said valve means including a nozzle provided with a row of openings, and means for selectively closing any of said openings without changing the angle of air injection into the chamber.

3. In a mixing machine for powdered materials, a mixing chamber having a plurality of pairs of merging annular channels in the same horizontal plane and through which air under pressure and materials to be mixed are swirled, each pair of said channels having an air inlet through which air under pressure continuously enters, means disposed between the channels in each pair for diverting air streams into said channels and causing said streams to merge with the air flow from the inlet at the point of joinder of the channels in each pair and means within and surrounded by each channel from which mixed powdered materials are continuously delivered from the chamber while the air inlet is continuously feeding air and unmixed powdered materials into the chamber.

4. In a mixing machine for powdered materials, a mixing chamber having several annular air channels in which air under pressure and materials to be mixed are swirled, and air inlets having means for selectively closing any of them entering into the chamber at a point between said channels, said channels merging adjacent said air inlets whereby streams of air swirled in the channels will merge with the air flow from the air inlets.

SAMU-EL ISH-SHALOM.